United States Patent [19]
McC Estabrook

[11] Patent Number: 6,052,579
[45] Date of Patent: Apr. 18, 2000

[54] METHODS AND APPARATUS FOR IMPROVED CELLULAR COMMUNICATION

[76] Inventor: David McC Estabrook, 6037 N. 20th St., Arlington, Va. 22205

[21] Appl. No.: 08/902,147

[22] Filed: Jul. 29, 1997

[51] Int. Cl.[7] .............................. H04B 1/38; H04M 11/00
[52] U.S. Cl. .............................. 455/418; 455/90; 455/550
[58] Field of Search ........................ 358/400; 379/88.01, 379/88.11, 88.23–88.24, 92.03, 93.18, 93.26, 100.01, 112, 354, 355; 455/412–413, 418–420, 507, 90, 92, 88, 551–552, 575, 426, 428, 462, 465

[56] References Cited

U.S. PATENT DOCUMENTS

| | | | |
|---|---|---|---|
| 4,812,843 | 3/1989 | Champion, III et al. | 379/93.18 |
| 5,307,178 | 4/1994 | Yoneda | 358/400 |
| 5,659,597 | 8/1997 | Bareis et al. | 379/88.01 |
| 5,677,949 | 10/1997 | Macor | 379/354 |
| 5,737,394 | 4/1998 | Anderson et al. | 379/88.11 |

OTHER PUBLICATIONS

Undated advertisement from a 1997 magazine after applicant's original disclosure.

*Primary Examiner*—Curtis A. Kuntz
*Assistant Examiner*—George Eng
*Attorney, Agent, or Firm*—Law Offices of Peter H. Priest

[57] ABSTRACT

A cellular telephone system including a cellular telephone operable to perform functions programmed at a central location. The telephone transmits a code to a central computer, which then executes the function associated with the code. Functions include, for example, establishing a telephone connection between the telephone and a called number, providing access to voice mail, callback paging, and programming. The central computer may be programmed to associate new functions with particular codes. The telephone system also includes a base station for charging a battery of the cellular telephone, for low-battery or battery-free operation of the cellular telephone, and for programming the telephone or the central computer.

33 Claims, 7 Drawing Sheets

METHODS AND APPARATUS FOR IMPROVED CELLULAR COMMUNICATION

FIELD OF THE INVENTION

The present invention relates generally to wireless communication. More particularly, the invention relates to an improved cellular telephone system whose components can be constructed inexpensively and compactly, provides an integration of controls and functions, makes efficient use of power, and saves space and cost.

BACKGROUND OF THE INVENTION

Wireless communication has repeatedly proven and extended its usefulness since its earliest days, and as time has passed the technology has steadily improved. The improvement of the technology has made wireless communication widely available. The systems required have become smaller, consuming less power, and they have come to require less skill to operate. While early systems required a large assembly consuming substantial power, and required the operator to be able to transmit and receive in Morse Code, a present day wireless communication user need do no more than pull a communication device such as a cellular telephone out of his pocket, press a sequence of keys, and begin to communicate.

Progress toward universality of wireless communications is today exemplified by the cellular telephone network. With a cellular telephone, a user can communicate with other cellular telephone users or with conventional telephone users from a wider and wider geographic range, because of the large number of repeater stations in the cellular network.

Cellular telephones have advanced immensely since their introduction. They have become much smaller, and have become capable of digital data transmission as well as voice transmission. The additional features and small size have come with a cost, however. Adding additional features to a cellular telephone increases its complexity and cost, and tends to increase its size. Reducing the size of cellular telephone is presently accomplished through the development and use of highly miniaturized components. The use of such miniaturized components adds greatly to the cost of a device. Moreover, the substantial power requirements of cellular telephony limit further reductions in the size and weight of a battery-operated telephone because of the requirement that the battery be able to provide a certain amount of power. The power requirements of conventional cellular telephones require the battery to be a certain size, or alternatively, require the use of new and more expensive battery technologies, or else limit the length of time the telephone can be used without recharging or replacing the battery.

Other features of conventional cellular telephones include the ability to dial any number, as does an ordinary land-based telephone, to display the number being called and the various features being selected, and the ability to send and receive fax and data transmissions. All these features add to the expense and complexity of the cellular telephone. A less expensive and less complex phone is highly desirable for many users and applications.

Moreover, applications exist in which a cellular telephone with limited function would be highly desirable. An employer may wish to give a limited capability cellular telephone to a courier, for example, with which the courier could call a central office, or a parent may wish to give a child a cellular telephone with which the child can call home. The same features that add to the weight, complexity and expense of present-day cellular telephones also increase the risk of giving cellular telephones to employees or children, by allowing the employer or child to incur the expense of calling locations other than a central office or parents' home, respectively. Additionally, the risk of loss or theft of any expensive item is a factor to be considered.

By way of example, the flexibility of a conventional cellular telephone may make it highly attractive to thieves. Conventional cellular telephones can be used by thieves just as easily as by authorized users, and to call any location the thief wishes to call. In order both to discourage theft and to minimize inconvenience and expense to the user which may be caused by theft, one might wish to carry a cellular telephone which was usable only to call a limited range of locations such as one's home, one's office, or a roadside assistance service.

A limited-capability cellular telephone could advantageously achieve added flexibility, while retaining the reduced weight, size and cost occasioned by its reduced capability and the security benefits also occasioned thereby, if it were capable of being programmed at a central location controlled by an authorized user. Such a telephone would not need to be returned to a vendor each time a decision was made, for example, to add or remove callable locations from its inventory.

There exists, therefore, a need in the art for a cellular telephone transceiver which can be readily manufactured at a low size and weight without the need for miniaturization of components, which can be programmed to call only a limited number of calling locations, and whose inventory of calling locations can be reprogrammed by the user at a central location.

SUMMARY OF THE INVENTION

The present invention addresses the problems and provides the desired advantages described above, as well as other addressed further below, by providing a cellular phone having a compact and low-weight design. The design preferably includes a folding case and a flexible, retractable antenna which is extended and retracted by the action of opening and closing the transceiver. The phone preferably includes a multiposition switch which selects one of a limited number of numbers to be called or other functions to be executed. Unfolding and folding the phone preferably initiates and terminates a call. The phone is preferably capable of being programmed with a choice of numbers to call at a base station maintained by the user. The base station also preferably includes power ports for charging phone batteries, and a power supply which can be used to operate the phone without a battery.

A more complete understanding of the present invention, as well as further features and advantages of the invention, will be apparent from the following Detailed Description and the accompanying drawings.

DETAILED DESCRIPTION

Figure 1:
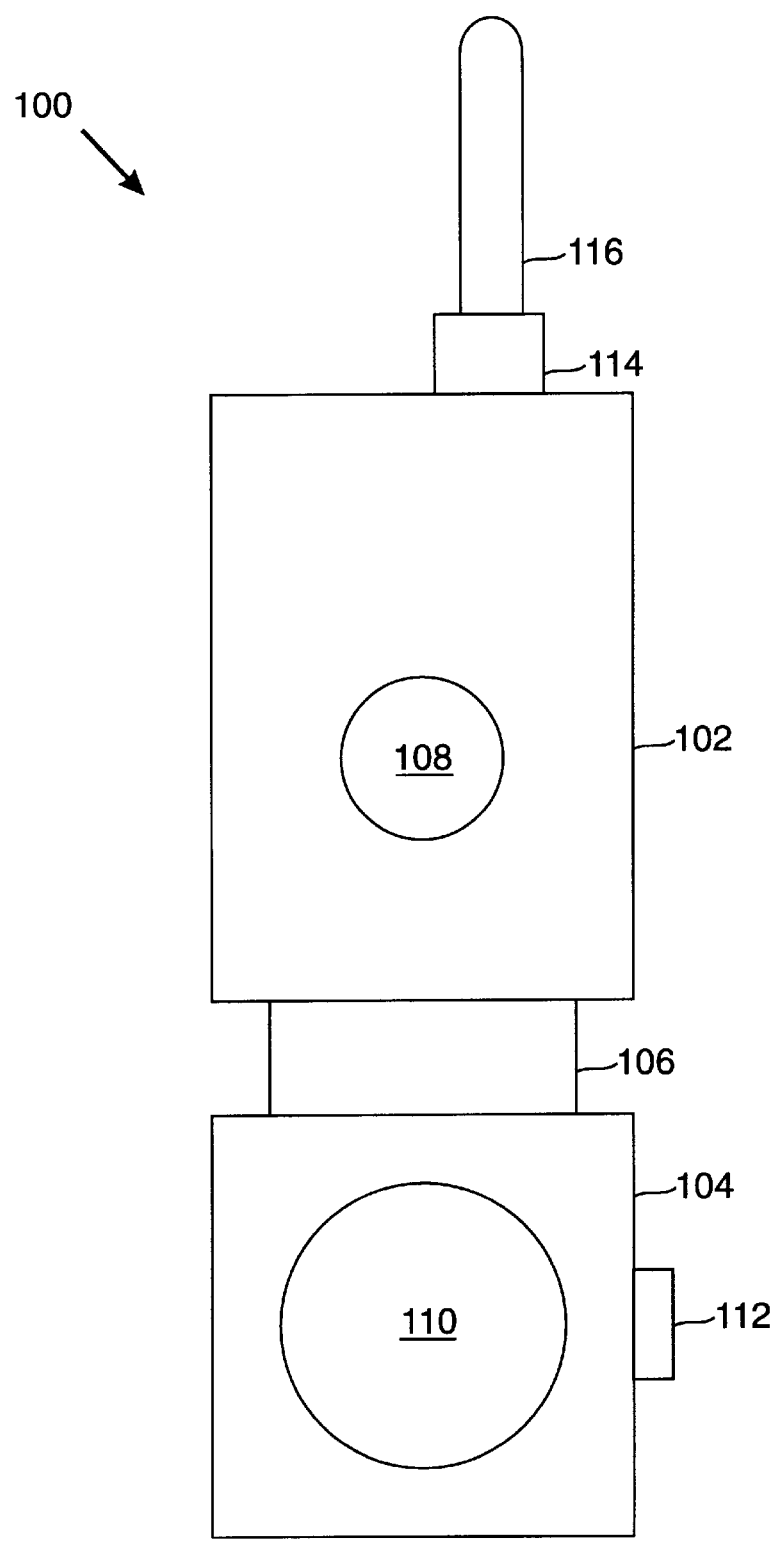
FIG. 1 is a front view of a telephone according to a first embodiment of the present invention.

FIG. 1 illustrates a low-cost cellular telephone 100 according to the teachings of the present invention. Telephone 100 includes an earpiece 102, a mouthpiece 104, and a folding hinge 106. The hinge 106 connects the earpiece 102 to the mouthpiece 104, and allows telephone 100 to be folded into a more compact configuration when not in use. Earpiece 102 contains a speaker 108 and an antenna guard 114. A portion of an antenna 116 extends above the antenna guard 114 when the telephone 100 is in the open and operative position illustrated in FIG. 1. Mouthpiece 104 contains a microphone 110 and a multiple-position thumb switch 112. The operation of thumb switch 112 is described in greater detail in connection with the discussion of FIG. 4 below. Setting the thumb switch 112 to one of its available positions selects a number to be dialed, or another function to be executed. Opening the telephone 100 causes telephone 100 to execute the selected function. If the function selected is the dialing of a specified number, telephone 100 executes the function by connecting to a cellular network and dialing the selected number. Closing cellular telephone 100 ends the call and disconnects telephone 100 from the cellular network. A call can also be disconnected by moving the thumb switch 112 from one position to another. This movement has the effect of disconnecting the current call and dialling the number selected by the new thumb switch position or, if the thumb switch is moved so as to select an alternative function, executing that alternative function.

The ability of the telephone 100 to select the number to be called through simply positioning the thumb switch 112 allows the telephone 100 to be designed with no display screen and no keypad. These items consume significant amounts of power in typical prior art telephones. The ability of telephone 100 to be operated without a display screen and keypad also allow telephone 100 to be designed with a smaller size and weight, without resort to expensive miniaturization, as is required when it is desired to design small cellular telephones of the present state of the art. Moreover, in typical prior art small cellular telephones, the display screen and keypad are quite small, and thus inconvenient for the user. The ability of a telephone 100 according to the present invention to be operated without a display screen and keypad removes the necessity of going to the expense of miniaturizing components which, because of their small physical size, are inconvenient to use.

The reduced power consumption of telephone 100 also allows the use of a smaller, lower-cost, or lower-capacity battery, as opposed to a large, higher-capacity battery or a small, higher-capacity, high-cost battery, as is typical in typical prior art telephones.

FIG. 1 also illustrates an indicator light 115, which provides information about the operating state and battery condition of telephone 100. When telephone 100 is turned on, light 115 illuminates. When a call is being initiated or received, or is currently active, the light 115 flashes. When a received call has been forwarded to voice mail, the light 115 flashes rapidly. When the battery of telephone 100 is low, light 115 flashes slowly. When telephone 100 is turned off, or when the battery is too low to power the telephone 100, the light 115 is off.

Figure 2:
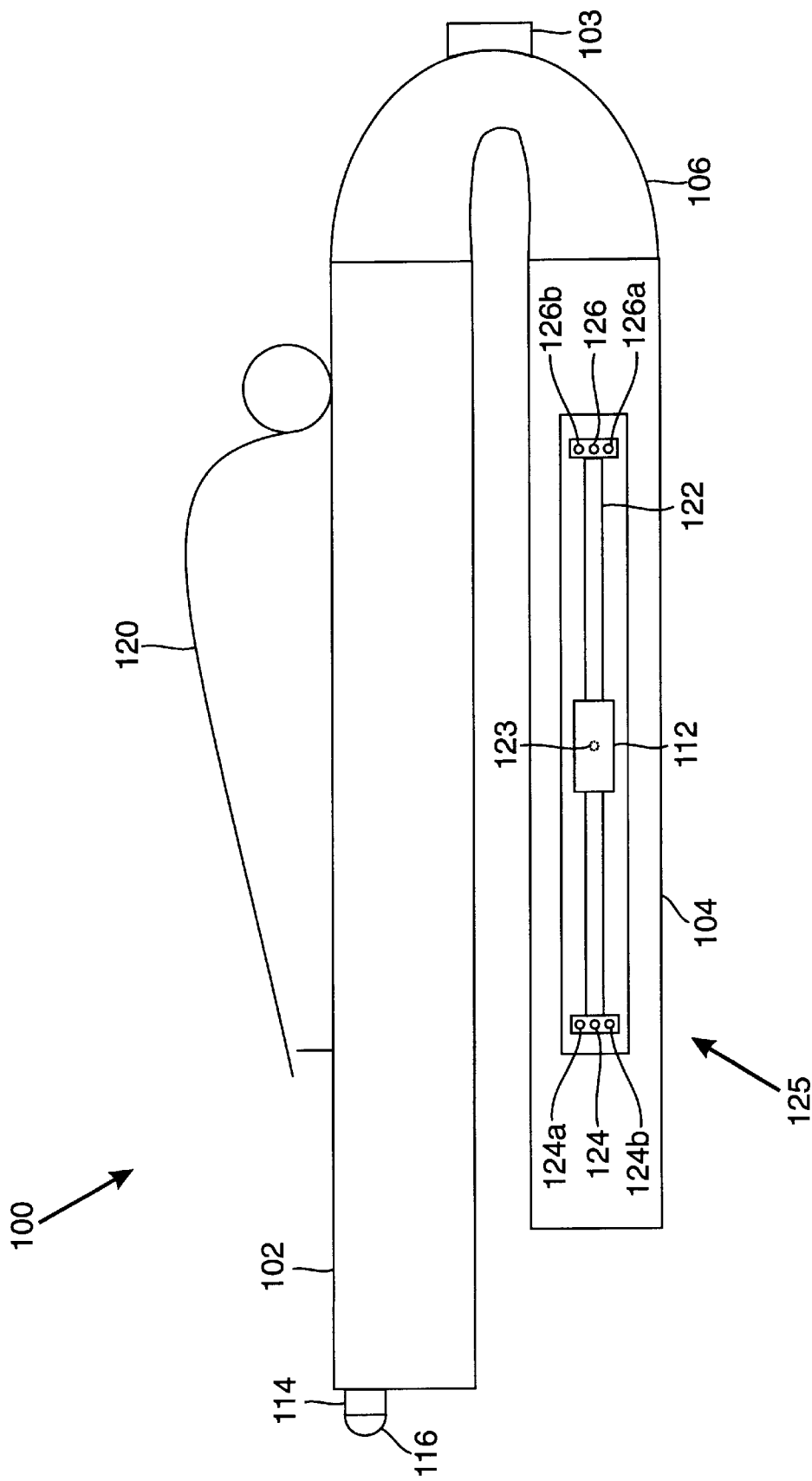
FIG. 2 is a side view of the telephone of FIG. 1 showing the telephone in a closed position.

FIG. 2 is a side view of telephone 100 in a folded configuration, illustrating additional features of telephone 100. FIG. 2 shows side views of earpiece 102, mouthpiece 104 and hinge 106, as well as antenna guard 114 and antenna 116. An on-off switch 103 may be suitably located on the hinge 106 so that it is automatically moved to the on position to allow the telephone 100 to make a call upon opening the phone. On-off switch 103 is also suitably designed so that if it is manually moved to the off position when the telephone 100 is open, it cannot be moved to the on position until telephone 100 has been closed.

It can be seen that antenna 116 is retracted when telephone 100 is in a folded configuration. In the illustrated embodiment, hinge 106 consists of a flexible cable which attaches to the antenna 116. When telephone 100 is folded, as shown, the hinge then automatically 106 pulls the antenna 116 into its retracted position. When telephone 100 is open, as shown in FIG. 1, the hinge 106 automatically pushes antenna 116 into an extended position which is not shown. The described arrangement for extension and retraction of antenna 116 consumes no power, and allows the antenna 116 to be properly extended and retracted as an automatic adjunct to the operation of telephone 100. The automatic extending and retracting feature of antenna 116 increases the compactness of telephone 100 without the prohibitive power needs of extending and retracting the antenna with a motor, and also without the inconvenience to the user of manually extending and retracting a telescoping antenna. Moreover, the fact that the antenna 116 is automatically extended when telephone 100 is operated conserves power. A user may forget or neglect to manually extend a telescoping antenna, and operation of a telephone with the antenna retracted decreases efficiency and thus increases power consumption. The automatic extension of antenna 116 prevents this problem thereby helping to conserve power.

FIG. 2 also shows a belt clip 120, and illustrates further details of operation of the thumb switch 112. As shown in FIG. 2, the thumb switch 112 preferably operates as part of a thumb switch assembly 125. In the illustrated embodiment, thumb switch 112 can be moved within a track 122 of the thumb switch assembly 125, to any of seven positions illustrated as circles: 123, 124, 124a, 124b, 126, 126a, and 126b to control the operation of telephone 100 as described more fully below.

It will be seen that the integration of the call initiating and terminating function with the folding and unfolding of telephone 100 significantly simplifies operation. Since opening telephone 100 initiates the call, and closing telephone 100 terminates the call, the user can be confident that the call is being properly initiated or terminated without having to look at telephone 100 or to search for buttons. In small cellular telephones typical of the present state of the art, operating buttons or keys are often located very close together. Pressing the proper button requires concentration and the wrong button or multiple buttons may be easily pressed. The button-free operation of telephone 100 prevents this difficulty from occurring.

Figure 3:
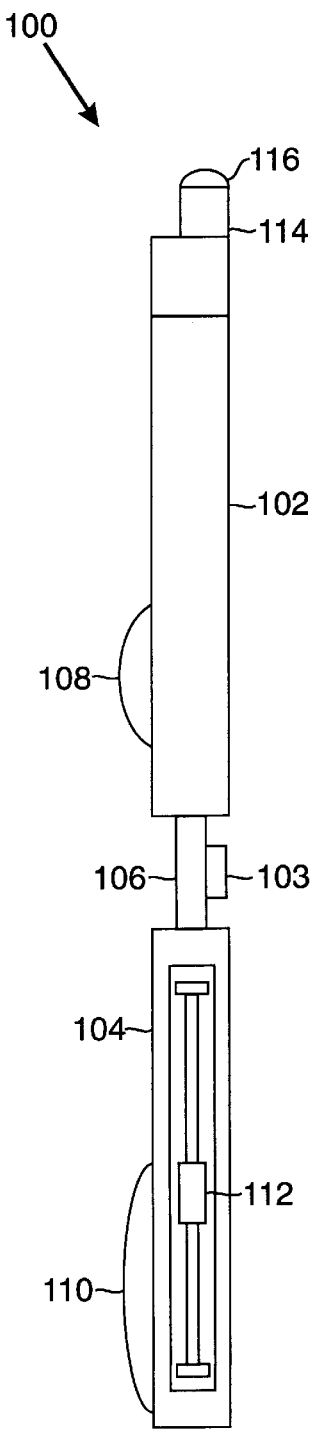
FIG. 3 is a side view of the telephone of FIG. 1 showing the telephone in an open position.

FIG. 3 is a side view of the telephone 100 in an open configuration. FIG. 3 shows earpiece 102, mouthpiece 104, hinge 106, on-off switch 103, antenna guard 114, antenna 116, thumb switch 112, and belt clip 120. FIG. 3 also shows speaker 108 and microphone 110. As shown in FIG. 3, the speaker 108 is preferably convex. This shape allows speaker 108 to form a seal with a user's ear, reducing the volume required for audibility and thus reducing power requirements of the telephone 100. Microphone 110 is preferably of a high-sensitivity and directional design, allowing telephone 100 to be useful even in conditions of high ambient noise.

Figure 4:
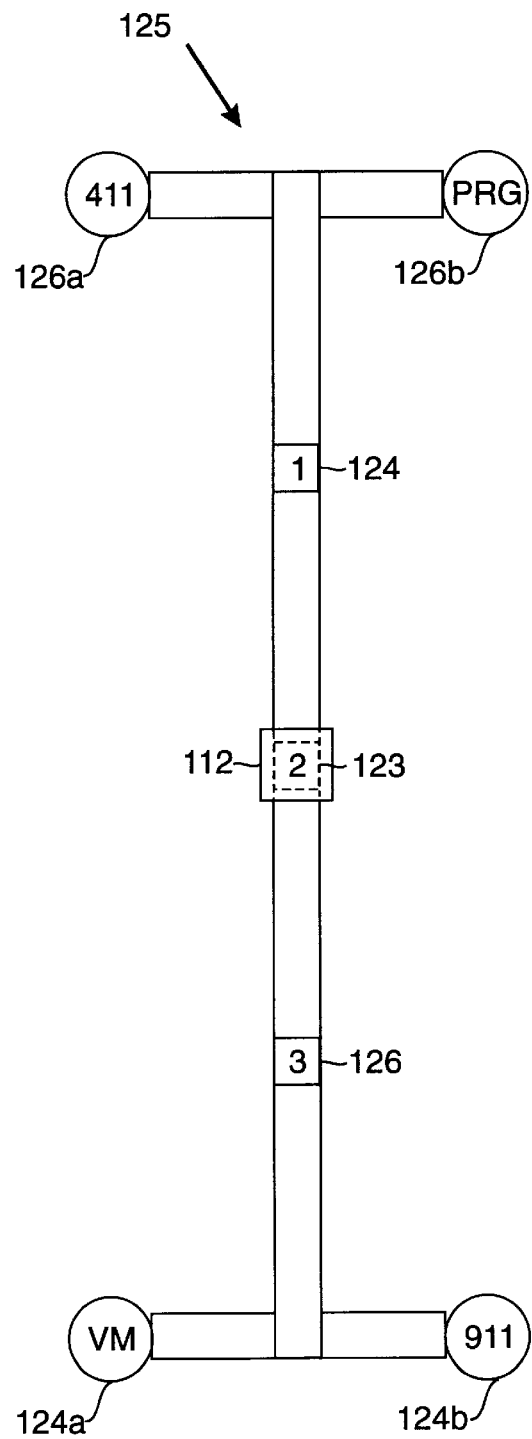
FIG. 4 is a detailed illustration of a thumb switch assembly according to one aspect of the present invention.

FIG. 4 is a more detailed representation of the thumb switch assembly 125, showing thumb switch 112 and also showing first, second and third switch positions 124, 123 and 126, respectively. Positions 124, 123 and 126 are programmable with telephone numbers selected by the user. Thumb switch assembly 125 also includes fourth, fifth, sixth and seventh positions 124a, 124b, 126a and 126b. In the illustrated embodiment, positions 124a, 124b, 126a and 126b are preprogrammed with Voice Mail, 911, 411 and the programming setting, respectively, but a manufacturer or user can program positions 132, 134, and 136 with other settings as desired.

Figure 5:
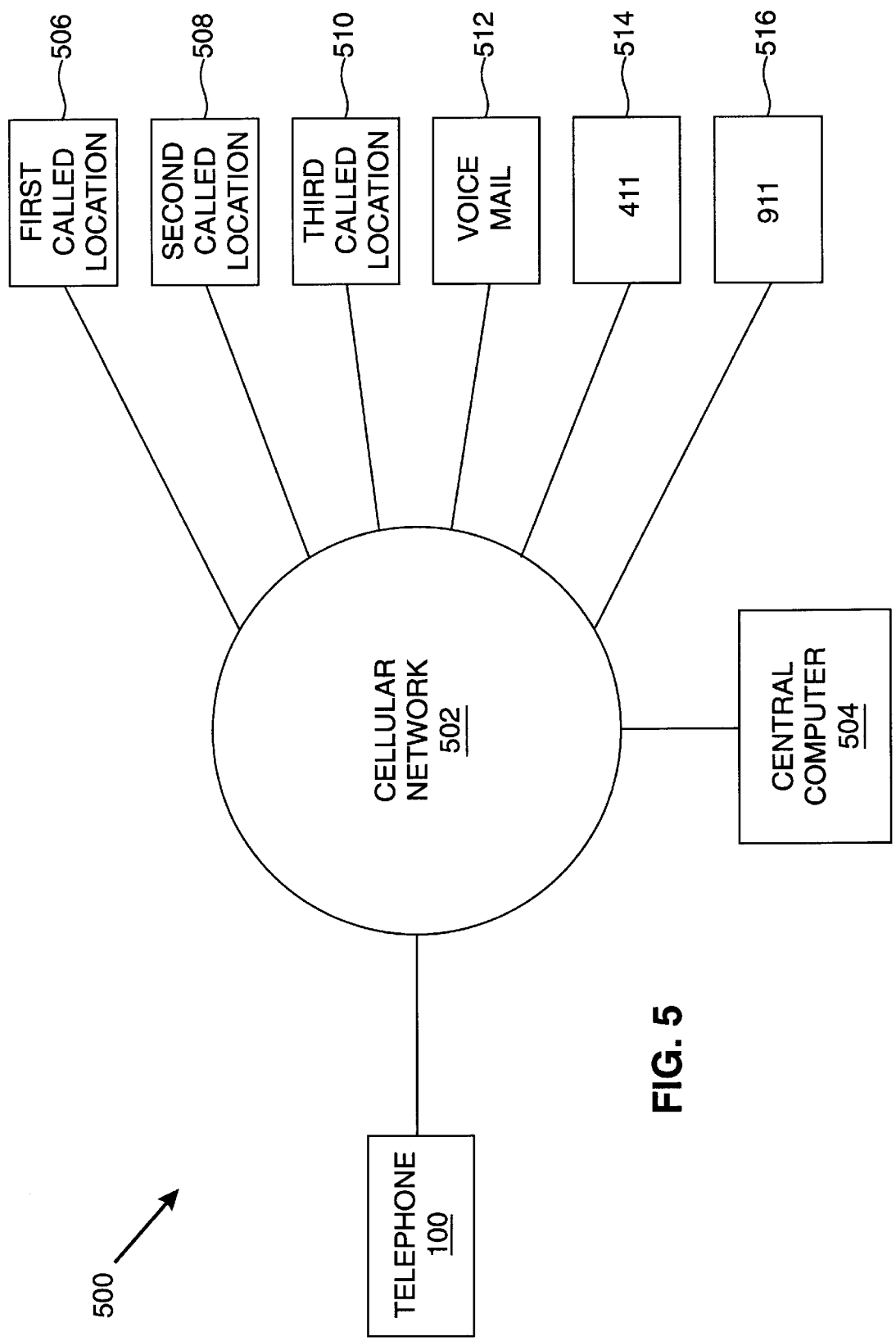
FIG. 5 is a block diagram of a telephone system according to the teachings of the present invention.

FIG. 5 illustrates a system 500 including the telephone 100, whereby telephone 100 can be programmed, used to retrieve voice mail or used to make calls. System 500 includes the telephone 100, or a plurality of telephones like the telephone 100, a cellular telephone network 502 and a central computer 504. In order to program the telephone 100, the user places switch 112 in the programming position 124b. The user then opens the telephone 100. Telephone 100, when opened, automatically connects to the cellular network 502 and calls the central computer 504. Upon connecting to central computer 504, telephone 100 sends an identifying signal and a signal indicating the programming mode. Central computer 504 sends voice prompts and programming signals to telephone 100, and is directed by the user through the user's voice responses. Central computer 504 preferably recognizes at least the digits 1 through 9, and the words "yes" and "no." Upon connecting to the central computer 502, the user can program the first, second and third thumb switch settings 124, 123 and 126 by vocally responding to a menu of prompts and appropriately positioning the thumb switch 112.

After such programming, when the thumb switch 112 is set to any of positions 124, 123, and 126 and the telephone 100 is then opened, the telephone 100 connects to the cellular network 504 and then dials central computer 504. Telephone 100 provides to computer 504 a telephone number, or alternatively a code which computer 504 then translates to a telephone number. Employing the computer 504 to translate codes to telephone numbers saves memory in telephone 100, again reducing the size and expense of telephone 100. Computer 504 then calls the selected called location, illustrated in FIG. 5, by way of example, as first, second or third called locations 506, 508, and 510 respectively. Telephone 100 operates similarly when thumb switch 112 is set to either of the positions 124b, or 126a to call 411 operator 514 or 911 operator 516, respectively.

When thumb switch 112 is set to position 124a and telephone 100 is opened, telephone connects to cellular network 502 and connects to the user's voice mail 512. A suitable method of accessing voice mail using telephone 100 is for telephone 100 to call central computer 504, identify telephone 100 and send an appropriate code to access voice mail. Central computer 504 then suitably delivers the user's voice mail by issuing voice prompts, receiving and acting on voice responses, and playing the selected voice mail messages.

Numerous optional functions can be implemented in computer 504, with telephone 100 being required merely to send an abbreviated code to activate the selected function. Functions which are suitably implemented by computer 504 include directory assistance, a link to a live operator callback paging system, automatic call forwarding, automatic voice mail forwarding and automatic call rejection or transfer to voice mail. A callback paging function could be implemented by having telephone 100 dial a number entered into the central computer 504 by the paging party. Upon receiving a paging tone, a user would open telephone 100, which would then connect to the cellular network 502, and dial central computer 504. Central computer 504 would then dial the number entered into the central computer 504. Alternatively, a callback paging function could be implemented such that telephone 100 would dial a single preselected number when opened in response to a paging tone.

The use of central computer 504 also allows a central authority to limit the use of telephone 100 as desired. For example, it may be desired to prevent telephone 100 from receiving incoming calls, to limit the numbers which telephone 100 can be programmed to call to a limited selection of telephone numbers, to limit telephone 100 to be able only to call a single location such as home, or the office to limit useage to making only local calls, or the like. The present invention is highly flexible and adaptive.

Figure 6:
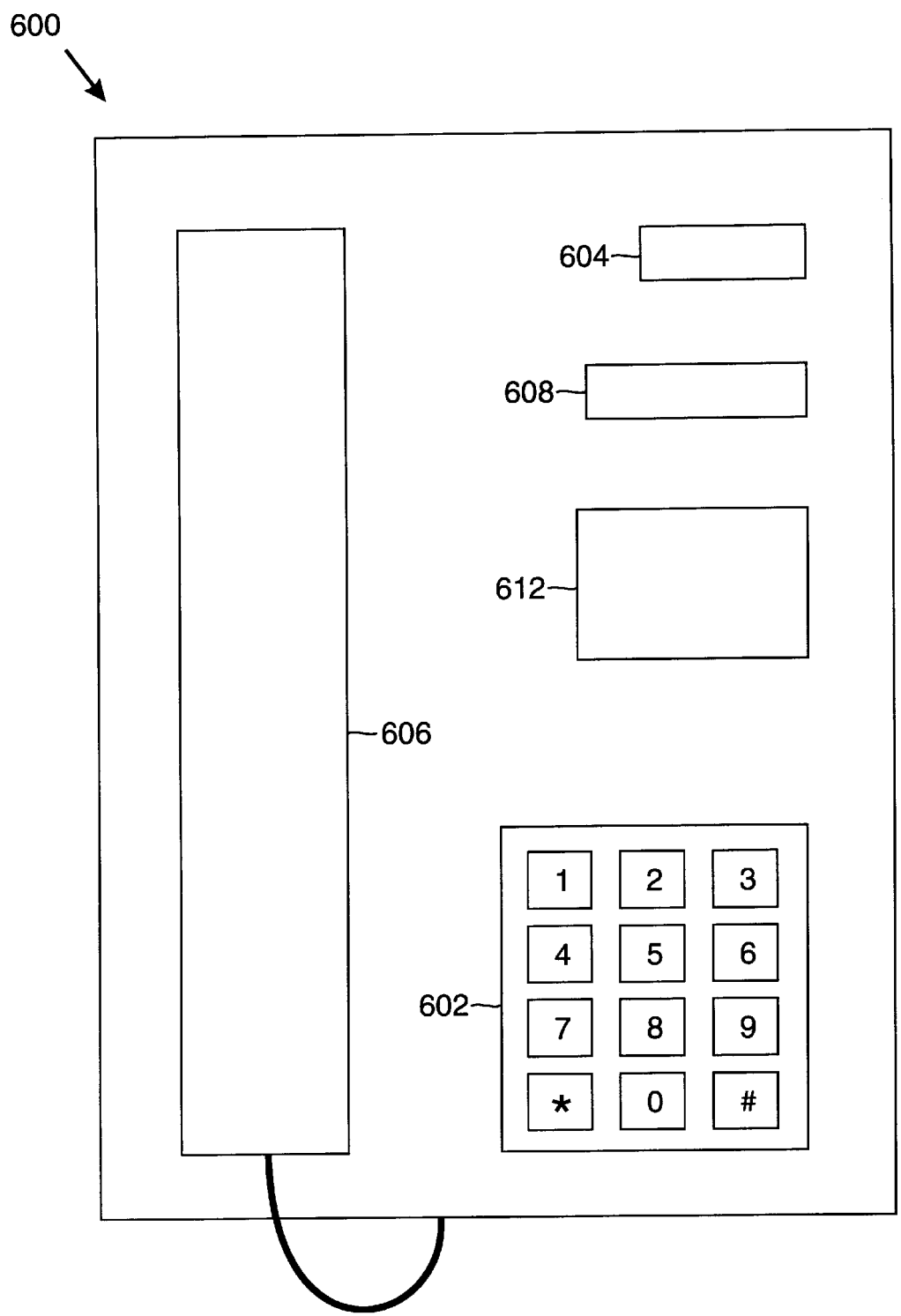
FIG. 6 is an illustration of a base station according to further aspects of the present invention.

FIG. 6 illustrates a base station 600 which may also be suitably used in conjunction with the telephone 100. Base station 600 preferably includes a keypad 602, a battery charging port 604, a handset 606, a multifunction charging, supplemental power and programming port 608, a cord 610 to connect the handset 606, and a display screen 612. Telephone 100 can be inserted into the multifunction port 608 to charge the battery of the telephone 100 while the battery is still in telephone 100, for programming telephone 100 by making entries on keypad 602, or to operating telephone 100 when its battery is fully or nearly discharged or removed. If telephone 100 is programmed with codes to be translated into telephone numbers by the central computer 504, multifunction port 608 need not provide a programming function. Instead, programming can be accomplished by communicating with central computer 504 through voice or keypad entries with telephone 100, with base station 600, or, if suitable security precautions are taken, such as suitable password protection or voice recognition, even with an ordinary telephone.

Figure 7:
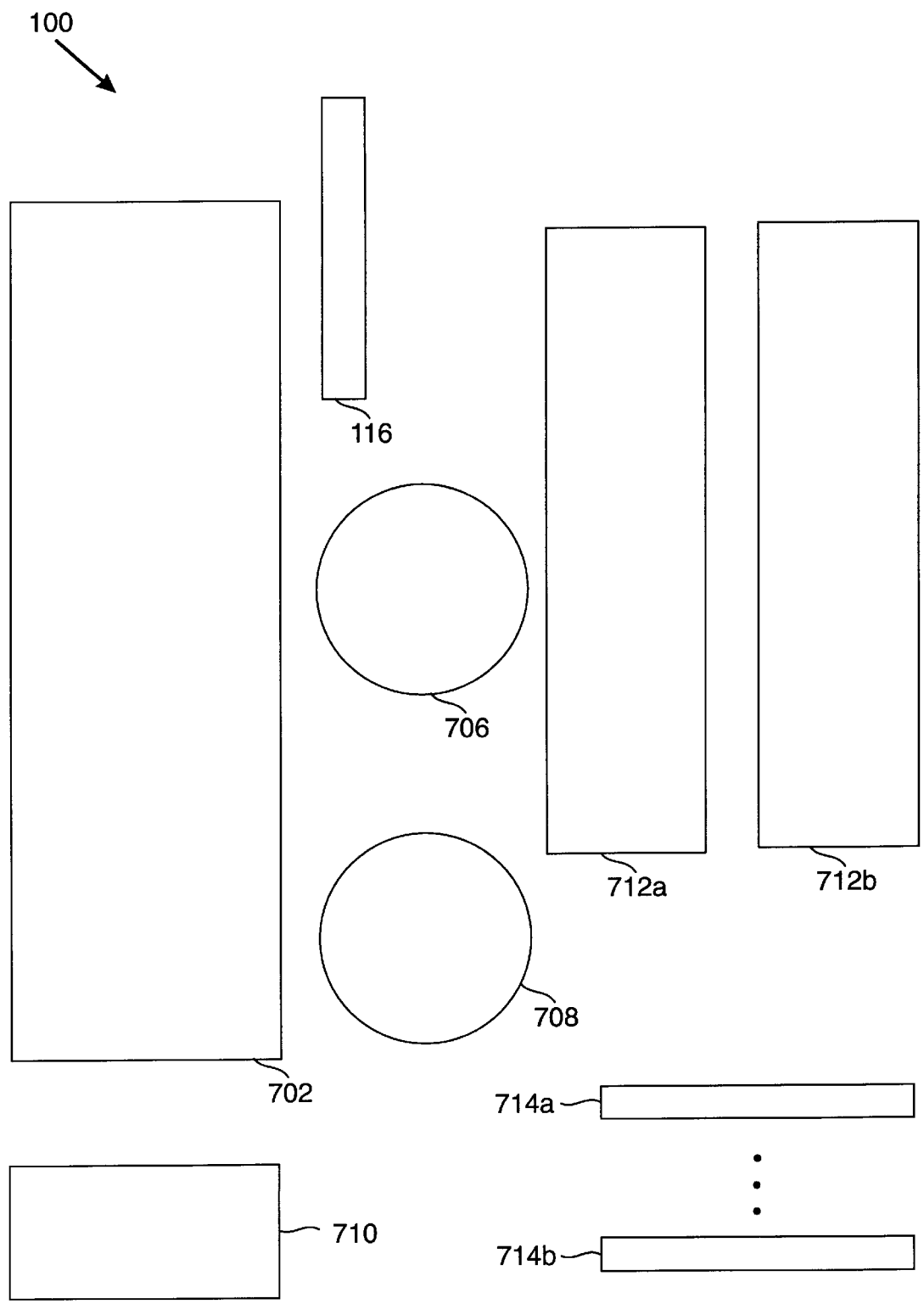
FIG. 7 is an exploded view showing parts suitable for constructing one embodiment of the telephone of FIG. 1.

FIG. 7 is an exploded view of the telephone 100 illustrating components which may preferably be employed in telephone 100. Telephone 100 preferably includes folding shell 702, antenna 116, speaker 706, microphone 708, battery 710 and one or more circuit modules. FIG. 7 illustrates two circuit modules 712a and 712b, which will suitably contain the electronic components necessary for the operation of telephone 100. It will be recognized, however, that telephone 100 may be designed with components on more or fewer circuit modules. The various components of telephone 100 are connected by standard connectors 714a. . . n. The modular construction of telephone 100 facilitates repair. It is a simple matter to remove a defective component and replace it with a new component. Moreover, the modular design allows telephone 100 to be upgraded in the same manner, through the removal of an existing component and its replacement with an improved component. A user can receive the benefit of technological advancements without the need to replace telephone 100 entirely.

Figure 8:
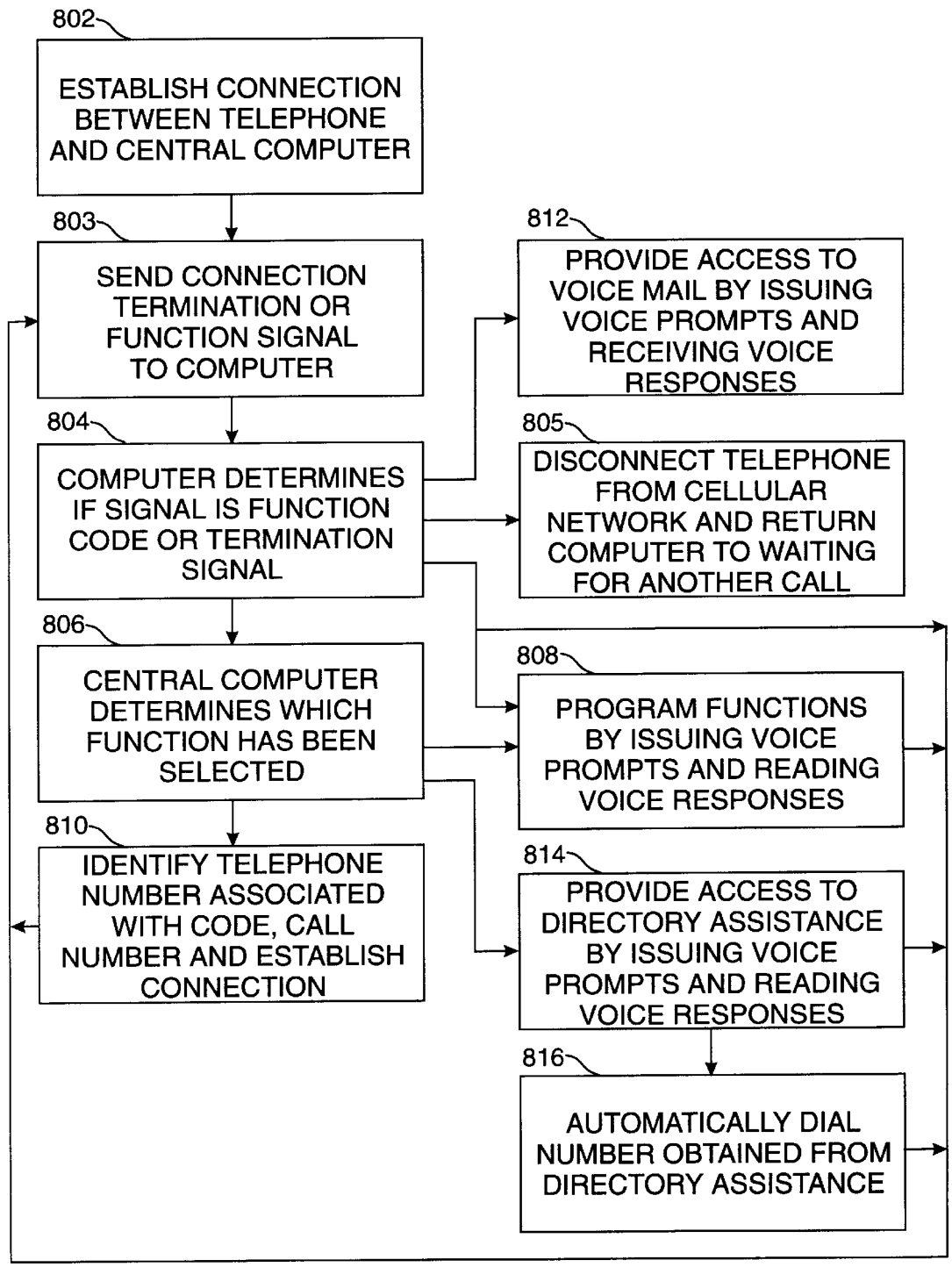
FIG. 8 is a diagram illustrating a method of wireless communication according to the teachings of the present invention.

FIG. 8 is a flowchart illustrating a method 800 of programming and using a cellular telephone according to the teachings of the present invention. At step 802, the telephone, such as telephone 100, calls a central computer, such as computer 504, over a cellular network, identifies itself, and establishes a connection. At step 803, the telephone sends a signal to the computer, either terminating the connection or transmitting a function code to the computer. At step 804, the computer examines the transmission received from the telephone to determine if it is a terminating signal or a function code. If the transmission is a terminating signal, control is transferred to step 805 and the computer disconnects the telephone from the cellular network and waits for another call from the telephone. If a function code has been transmitted, control is transferred to step 806. At step 806, the central computer examines the function code to determine which function has been selected. If the programming function has been selected, control is transferred to step 808 and the central computer enters a routine of issuing voice prompts and receiving inputs to program a function for each code which is desired to be programmed. After the programming step has been completed, the telephone transmits a new code to the central computer and control is transferred to step 804. If the function selected is to call a particular number, control is transferred to step 810. The central computer identifies the telephone number associated with the selected code, calls the number over the cellular network, and establishes a connection between the telephone and the called number over the cellular network. This step is used to access directory assistance, if directory assistance is implemented as a call to a human operator or to a remote automatic site. When the call is terminated, control is transferred to step 803 and the telephone sends a signal to the computer indicating the desired operation.

If the selected function is to access voice mail, control is transferred to step 812 and the computer enters the appropriate routine, receiving voice inputs from the user, providing voice prompts and playing selected messages. When the voice mail access is terminated, control is transferred to step 803 and the telephone sends a signal to the computer indicating the desired operation.

If the selected function is to access directory assistance as a function of the central computer, control is transferred to step 814 and the computer enters the directory assistance routine, receiving voice inputs from the user and providing voice prompts and playing directory assistance information recordings. The central computer may also provide an option whereby a number retrieved from directory assistance can be automatically dialed. If this option is chosen, control is transferred to step 816 and the number is dialed as described in the discussion of step 810. When the call is complete, control is transferred to step 803 and the telephone sends a signal to the computer indicating the desired operation.

I claim:

1. A cellular telephone system, comprising:
    a limited function cellular telephone transceiver for communicating over a cellular network without utilizing a display screen and without utilizing a keypad, the transceiver being operative to perform only a predefined set of preprogrammed functions, each of said functions being associated with one position of a multiposition switch, the transceiver being further operative to connect to a cellular telephone network and establish a connection to a central computer, the transceiver being further operative, once connection to the central computer is established, to transmit a preprogrammed code to the central computer, said code being selected prior to activating the cellular telephone by positioning said multiposition switch to the desired position, the central computer being operative to translate the preprogrammed code received from the transceiver to one of the predefined set of preprogrammed functions to be executed.

2. The cellular telephone system of claim 1, wherein the preprogrammed functions include associating the code received from the transceiver with a particular telephone number to be dialed, dialing that number, and establishing a connection between the transceiver and the telephone number.

3. The cellular telephone system of claim 1, wherein one of the plurality of codes is an indicator for selecting access to voice mail.

4. The cellular telephone system of claim 1, wherein one of the plurality of codes is an indicator for selecting a callback paging function.

5. A limited function cellular telephone transceiver for communicating over a cellular telephone network, the cellular telephone being operative to connect to the cellular network, calling a telephone number associated with a central computer, and transmitting one of a plurality of preprogrammed codes to the central computer, said codes not corresponding to any individual telephone numbers, the central computer being operative to execute the function associated with the transmitted code, and said transmitted code being selected prior to activating the limited function cellular telephone by positioning a multiposition switch to a desired position comprising:
    a microphone enclosed within a first element of a folding case;
    a speaker enclosed within a second element of a folding case;
    said first element and said second element of said folding case being attached by a flexible cable; and
    a retractable antenna attached to the folding case, the opening of the folding case serving to extend the antenna and the closing of the folding case serving to retract the antenna by action of the flexible cable.

6. The cellular telephone of claim 5, wherein one of the plurality of codes corresponds to a number to be dialed, establishing a connection over the cellular network between the cellular telephone and the central computer, and the central computer dialing the telephone number associated with the code.

7. The cellular telephone of claim 6, wherein one of the plurality of functions which may be specified by the code is establishing access to voice mail.

8. The cellular telephone of claim 7, wherein one of the plurality of functions which may be specified by the code is dialing directory information.

9. The cellular telephone of claim 8, wherein one of the plurality of functions which may be specified by the code is the execution of a programming operation to associate a desired function with one or more of the plurality of codes.

10. The cellular telephone of claim 5, being further operative to control the central computer by transmitting voice commands over the cellular network.

11. The cellular telephone of claim 5, wherein said multiposition switch further comprises a sliding thumb switch.

12. A computer for controlling a limited function cellular telephone by communicating with the cellular telephone over a cellular telephone network, the computer being operative to connect to the cellular telephone over the cellular telephone network, to receive one of a plurality of codes from the cellular telephone, and to execute one of a plurality of predefined functions associated with one of a plurality of codes received from the cellular telephone, wherein said one of said plurality of codes has been selected prior to activating the limited function cellular telephone by positioning a multiposition switch to a desired position.

13. The computer of claim 12, wherein one of the plurality of functions is to call a telephone number associated with the code received from the cellular telephone and to establish a connection between the called number and the cellular telephone over the cellular network.

14. The computer of claim 13, wherein one of the plurality of functions is to provide access to voice mail.

15. The computer of claim 14, wherein one of the plurality of functions is to provide access to directory assistance.

16. The computer of claim 15, wherein one of the plurality of functions is to execute a programming operation to associate a desired function with one or more of the plurality of codes.

17. The computer of claim 16, wherein one of the plurality of functions is to receive a from a calling location a call directed to the telephone and establish communication over the cellular network between the calling location and the telephone.

18. The computer of claim 17, wherein the computer is further operative to store a plurality of calling locations from which the telephone is permitted to receive calls, to receive from a calling location a call directed to the telephone, to compare the calling location against the calling locations from which the telephone is permitted to receive calls, to establish communication between the telephone and a calling location from which the telephone is permitted to receive calls and to reject a call from a calling location from which the telephone is not permitted to receive calls.

19. The computer of claim 18, wherein the computer is further operative to route rejected calls to voice mail.

20. The computer of claim 19, wherein the computer is further operative to maintain criteria by which rejected calls are to be refused or routed to voice mail, refuses rejected calls which meet the criteria for refusing calls and routes to voice mail rejected calls which meet the criteria for routing calls to voice mail.

21. The computer of claim 16, wherein the computer accomplishes the programming operation by receiving a call from a telephone, the central computer providing voice prompts and receiving voice responses, the computer associating a selected code with a desired function in response to the voice responses.

22. The computer of claim 16, wherein the programming function is accomplished by receiving a call from a touch-tone telephone, the central computer providing voice prompts and receiving keystroke tones, the computer associating a selected code with a desired function in response the received keystroke tones.

23. A method of cellular communication, comprising:
establishing a connection over a cellular network between a limited function cellular telephone transceiver and a central computer;
transmitting one of a plurality of codes from the transceiver to the central computer, said one of said plurality codes being selected prior to activating the limited function cellular telephone by positioning a multiposition switch to a desired position, each of the codes being associated with a particular function, the functions including calling one of a plurality of particular telephone numbers, programming the transceiver to associate new telephone numbers with one or more of the plurality of codes, and providing access to voice mail;
employing the central computer to execute one of a plurality of functions, the function to be executed being designated by the transmitted code;
employing the central computer to execute the function represented by the code;
if the function to be executed is executing the programming function, employing the central computer to issue prompts and receive responses to identify the new telephone number to be associated with the code;
if the function to be executed is providing access to voice mail, employing the central computer to issue prompts and receive responses to properly identify, store, and replay voice mail messages, as required, and to record voice mail messages to be stored; and
if the function to be executed is dialing one of the plurality of telephone numbers, employing the central computer to dial the number specified by the code and employing the central computer to establish a connection over the cellular network between the dialed number and the transceiver.

24. A limited function cellular telephone for use with a cellular telephone system which operates without a display screen and without a keypad, comprising:
a two element folding case, comprising;
a mouthpiece containing a microphone and a multiposition switch for selecting one of a plurality of functions which is being determined by a position of the multiposition switch enclosed within a first element of the folding case;
an earpiece containing a speaker enclosed within a second element of the folding case; and
said first element and said second element of said folding case being attached by a flexible cable;
a rechargeable battery;
a transmitting/receiving unit for sending and receiving transmissions over a cellular telephone network; and
a programmable storage unit for storing said plurality of functions to be executed by the telephone, the stored functions including dialing only a plurality of prestored telephone numbers, each of said prestored numbers being programmed into said programmable storage unit.

25. A cellular telephone for communicating over a cellular telephone network, comprising:
a folding case;
a microphone enclosed within the folding case;
a speaker enclosed within the folding case; and
a retractable antenna attached to the folding case;
a transceiving unit for sending and receiving signals over the cellular telephone network;
a programmable storage unit for storing a plurality of functions to be executed by the telephone, the functions including dialing only a plurality of prestored telephone numbers, receiving new programmed functions, and providing access to voicemail; and
a multiposition switch for selecting one of the plurality of functions to be executed by the telephone.

26. The cellular telephone of claim 25, further comprising a retractable antenna attached to the folding case, the opening of the folding case serving to extend the antenna and the closing of the folding case serving to retract the antenna.

27. The cellular telephone of claim 26, further comprising a power switch, said power switch being operable to activate the telephone and initiate a telephone call when the folding case of said telephone is opened, said telephone call initiated corresponding to the preprogrammed function selected by said multiposition sliding thumb switch.

28. A low cost, low power cellular telephone for communicating over a cellular telephone network without utilizing a display screen and without utilizing a keypad, said cellular telephone comprising:
- a folding housing, comprising:
  - a mouthpiece containing a microphone;
  - an earpiece containing a speaker; and
  - a folding hinge connecting the mouthpiece and the earpiece;
- a multiposition selection switch for selecting one of a plurality of predetermined functions based upon the position of the multiposition selection switch;
- a memory for storing a plurality of functions to be executed by said cellular telephone, the stored functions including dialing only a plurality of prestored telephone numbers; and
- a controller operable to detect the position of the multiposition selection switch to execute the function associated with the position of the multiposition selection switch.

29. The low cost, low power cellular telephone of claim 28 further comprising a single indicator light which provides both operating state and battery condition information.

30. The low cost, low power cellular telephone of claim 28 further comprising a hinge activated switch located so as to change position upon opening of the folding hinge; the controller being operable to detect the change of position of the hinge activated switch to automatically dial one of the predetermined stored numbers upon a user selecting a number with the multiposition switch and opening the cellular telephone.

31. The low cost, low power cellular telephone of claim 28 further comprising a flexible extendible and retractable antenna attached to a hinge cable whereby said antenna is automatically extended upon opening the cellular telephone and automatically retracted upon closing the cellular telephone.

32. The low cost, low power cellular telephone of claim 28 wherein the multiposition switch is a thumb actuatable switch located on the housing in a position facilitating one-handed operation, the multiposition switch having a first set of positions corresponding to a predefined set of numbers and a second set of positions corresponding to a predefined set of functions.

33. The low cost, low power cellular telephone of claim 28 wherein said cellular telephone is programmed to call a predefined set of numbers to perform a predefined set of functions, and is operable without reprogramming to dial only the predefined set of numbers and perform only the predefined set of functions.

* * * * *